Patented May 14, 1940

2,200,689

UNITED STATES PATENT OFFICE 2,200,689

DYESTUFFS OF THE PYRAZINOCYANINE SERIES AND PROCESS OF MAKING THEM

Wilhelm Eckert and Ferdinand Quint, Frankfort-on-the-Main-Höchst, Germany, assignors to General Aniline & Film Corporation, a corporation of Delaware No Drawing. Application January 15, 1937, Serial No. 120,830. In Germany January 30, 1936

12 Claims. (Cl. 260—242)

The present invention relates to dyestuffs of the pyrazinocyanine series and to a process of preparing them.

Many patent specifications describe the preparation of metalliferous or non-metalliferous dyestuffs of the phthalocyanine series, for instance, by heating to a high temperature an ortho-dicyanide of the benzene or naphthalene series in a suitable organic solvent or diluent in the presence or absence of a certain metal salt. There may also be used as starting material aromatic compounds of the benzene or naphthalene series which are transformed in the course of the reaction into ortho-dinitriles.

We have found that heterocyclic dyestuffs of the pyrazinocyanine series are obtainable by condensing diamino-ethylene-dinitrile (obtainable, for instance, by polymerization of anhydrous hydrocyanic acid in known manner, cf., for instance, "Centralblatt" 1928 II, page 440) of the following formula:

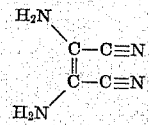

with compounds containing the

group, for instance, diacetyl, glyoxal, benzil, ortho-benzoquinone, acenaphthenequinones, thionaphthenequinones, phenanthrenequinones, aceanthrenequinones or the like, or with compounds containing the

group, for instance, omega-halogenacetophenones or substitution products thereof, and by heating at a high temperature, for instance, about 100° C. to about 300° C., in the presence or absence of a solvent, diluent and metal salts, the ortho-dinitriles of the pyrazine series thus obtained, containing the following atomic grouping:

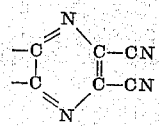

In this manner new dyestuffs of the pyrazinocyanine series are obtainable which otherwise are accessible not at all or only with difficulty. The dyestuffs obtained may be finely divided in the usual manner and are intended to be used as pigment dyestuffs. By sulfonation they may be transformed into the corresponding sulfonic acids which possess substantive properties for the vegetable fiber.

The following examples serve to illustrate the invention, but they are not intended to limit it thereto; the parts are by weight:—

1. 49 parts of diamino-ethylene-dinitrile are dissolved in 250 parts of boiling water and 5 parts of a glyoxal solution of 50 per cent. strength are added, while stirring. A yellow precipitate is obtained which on dilution with 350 parts of water and boiling for a short time dissolves, except a very small quantity thereof. The solution which is now light brown is clarified with 0.5 part of animal charcoal. From the filtered nearly colorless solution the pyrazine-2.3-dinitrile separates in the form of colorless feathery needles melting at 132° C. Small amounts of the product may further be obtained by concentrating the mother liquor. The course of the reaction may be illustrated by the following equation:

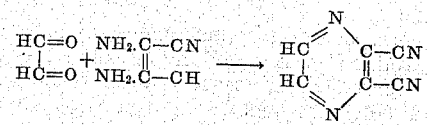

In order to prepare the copper complex compound a mixture of 4 parts of the dinitrile of the above formula, 8 parts of cuprous bromide and 28 parts of anhydrous pyridine is heated at 120° C. to 125° C., while stirring, in the course of 5 hours. The crystalline magma which has separated is filtered with suction while hot after dilution with pyridine and washed several times with warm pyridine and finally with ether. There remain 4.8 parts of a dark violet, crystalline powder. It is dissolved in 100 parts of concentrated sulfuric acid, and heated at 150° C. for 5 minutes in order to eliminate a brown impurity. The whole is poured on 400 parts of ice. The blue precipitate thus produced is filtered with suction on a sintered glass suction filter and washed until neutral. There remains a reddish blue powder, which possesses very good properties of fastness, as pigment dyestuff. It dissolves in concentrated sulfuric acid to a greenish blue solution.

Instead of the copper salt there may be used other heavy metal salts, whereby similar dyestuffs of the phthalocyanine series are obtained.

By heating the pyrazine-2.3-dinitrile of the formula indicated above in the absence of a metal salt, for instance, in sodium amylate, a dyestuff of the phthalocyanine series free from metal is formed.

2. 1 part of diamino-ethylene-dinitrile is heated on a water-bath for 15 to 20 minutes with 1 part of diacetyl in 10 parts of alcohol. After addition of a small quantity of animal charcoal, it is clarified, while hot, whereupon the 5.6-dimethyl-pyrazine-2.3-dinitrile of the formula:

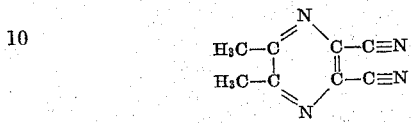

separates in the form of colorless leaflets having a mother-of-pearl luster and melting at 168° C. to 169° C. They are very easily soluble in acetone, benzene and their homologues but sparingly soluble in water.

The corresponding copper complex compound is prepared in the manner indicated in Example 1. The crude product thus obtained separates in the form of a black powder which is dissolved in concentrated sulfuric acid, in which it dissolves to a green solution, and reprecipitated; it then forms a blue pigment of good properties of fastness.

3. 1 part of diamino-ethylene-dinitrile is heated for 2½ to 3 hours, on the water-bath, while stirring, with 2 parts of benzil in 20 parts of alcohol. The condensation product begins to separate even from the boiling solution. After cooling, the 5,6-diphenyl-pyrazine-2.3-dinitrile of the following formula:

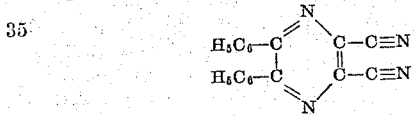

is obtained in the form of a colorless crystalline powder melting at 245° C. to 246° C. It is sparingly soluble in alcohol and in ether, and very easily soluble in acetone and benzene. It dissolves in concentrated sulfuric acid to a yellow solution.

The corresponding copper complex compound is prepared in the manner indicated in the preceding examples. A green powder is obtained which dissolves in concentrated sulfuric acid to a violet solution, which on heating to above 100° C. turns to green and on cooling again becomes violet. The product is dissolved in concentrated sulfuric acid and reprecipitated and then constitutes a powder of emerald color which has very good properties of fastness as pigment dyestuff.

4. 1.08 parts of diamino-ethylene-dinitrile are heated to boiling for 4 hours with 1.82 parts of acenaphthene-quinone in 45 parts of dioxane. Already in the course of boiling brown needles separate from the yellow solution. When the reaction is at an end, the precipitation of the condensation product is completed by addition of water. After recrystallization from dioxane with addition of animal charcoal the peri-naphthylene-5,6-pyrazine-2.3-dinitrile of the formula:

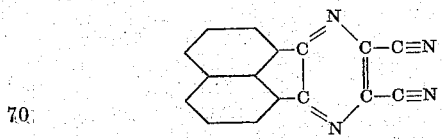

is obtained in the form of pale yellow leaflets, which darken at 290° C. and decompose at 325° C. to 326° C. It is sparingly soluble in alcohol and in water, and easily soluble in acetone and in benzene. It dissolves in concentrated sulfuric acid to a yellow solution.

The copper complex compound prepared in the manner indicated in the preceding examples is a greenish black powder which dissolves in concentrated sulfuric acid to a green solution and is precipitated therefrom on addition of ice in the form of green flakes which when washed until neutral and dried are a green powder which has as pigment dyestuff very good properties of fastness.

5. 1.64 parts of thionaphthenequinone and 1.2 parts of diamino-ethylene-dinitrile are introduced into 100 parts of boiling water and the whole is boiled for a short time. The 5.6-(2'.3'-thionaphthene)-pyrazine-2.3-dinitrile of the formula:

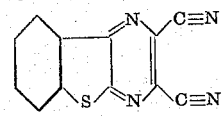

crystallizes with decolorization. When recrystallized from 500 parts of alcohol with addition of 2 parts of animal charcoal it is obtained in the form of feebly yellow small needles which melt at 211° C. to 212° C. (the melt has a green color) and dissolve in concentrated sulfuric acid to an orange solution. The yield amounts to 1.8 parts.

The copper complex compound obtained in the manner described in the preceding examples is redissolved in concentrated sulfuric acid, in which it dissolves to an olive green solution, and forms after reprecipitation a yellow green powder which has as pigment dyestuff very good properties of fastness. It can be sulfonated smoothly. The sulfonic acid which dissolves in water to a yellow green solution, substantively dyes vegetable fibers yellow green tints.

6. 15 parts of omega-chloroacetophenone and 11 parts of diamino-ethylene-dinitrile are heated in 100 parts of alcohol to boiling for 15 hours. On cooling, brown crystals separate from the dark brown solution, which crystallize from alcohol after decolorizing with charcoal in the form of colorless coarse slate-like plates having a length up to about 1 cm. They melt at 169° C. to 170° C. After a short time the melt assumes a green color (formation of the phthalocyanine complex), the change being strongly catalyzed by traces of metal (trituration with a nickel spatula suffices).

The condensation product dissolves in concentrated sulfuric acid to a greenish yellow solution. The course of the preliminary reaction may be illustrated by the following equation:

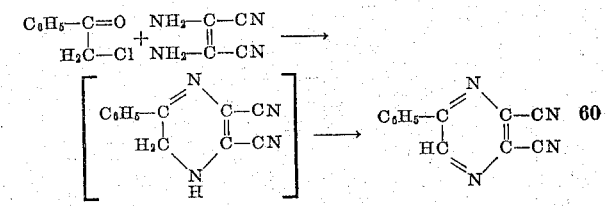

The copper complex compound prepared therefrom in the manner above indicated forms a blue green powder which is soluble to a small extent in pyridine to a blue green solution and in concentrated sulfuric acid to a green grey solution. It possesses very good fastness properties as pigment dyestuff.

We claim:

1. A process of making a dyestuff of the pyrazinocyanine series which comprises condensing diaminoethylene-dinitrile with a compound selected from the group consisting of diacetyl, glyoxal, benzil, ortho-benzoquinone, acenaphthene-quinone, thionaphthene-quinone, aceanthrene-quinone, omega-halogen-aceto-phenone, substitution products thereof which contain the 1.2-diketo group, and substitution products which contain the 1-keto-2-chloro group, the ring condensation product thus obtained having two nitrile groups in ortho-position to each other, and heating said product up to temperatures between about 100° C. and about 300° C.

2. The process of claim 1 in which the heating is performed in the presence of a diluent and of cuprous bromide.

3. The process of claim 1 in which the heating is performed at about 120° C. to about 125° C. for five hours with cuprous bromide in the presence of pyridine.

4. A process of making dyestuffs of the pyrazinocyanine series which comprises condensing diaminoethylene-dinitrile with glyoxal in the presence of boiling water, and heating the resulting pyrazine-2.3-dinitrile at temperatures of from about 120° C. to about 125° C. in the presence of cuprous bromide and anhydrous pyridine.

5. A process of making dyestuffs of the pyrazinocyanine series which comprises condensing diaminoethylenedinitrile with benzil in the presence of boiling alcohol and heating the resulting 5.6-diphenyl-pyrazine-2.3-dinitrile at temperatures of from about 120° C. to about 125° C. in the presence of cuprous bromide and anhydrous pyridine.

6. A process of making dyestuffs of the pyrazinocyanine series which comprises condensing diaminoethylenedinitrile with omegachloracetophenone in the presence of boiling alcohol, and heating the resulting 6-phenylpyrazine-2.3-dinitrile at temperatures from about 120° C. to about 125° C. in the presence of cuprous bromide and anhydrous pyridine.

7. The pigments which are obtained by heating at temperatures between about 100° C. and about 300° C. a compound of the group consisting of pyrazine-2.3-dinitriles of the general formulae

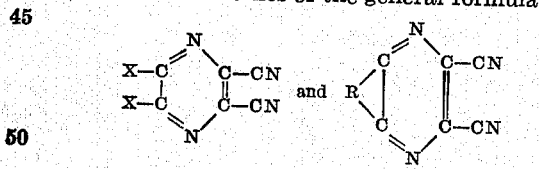

wherein X represents a member of the group consisting of hydrogen, methyl and phenyl and R represents a member of the group consisting of

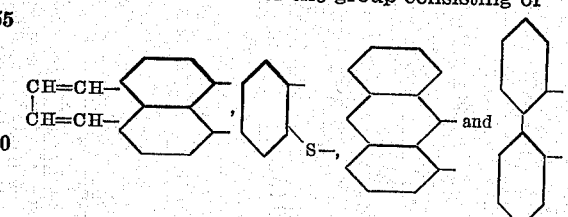

8. The pigments which are obtained by heating at temperatures between about 100° C. and about 300° C. in the presence of a diluent and cuprous bromide a compound of the group consisting of pyrazine-2.3-dinitriles of the general formulae

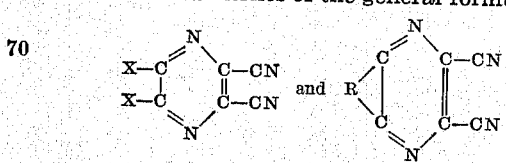

wherein X represents a member of the group consisting of hydrogen, methyl and phenyl and R represents a member of the group consisting of

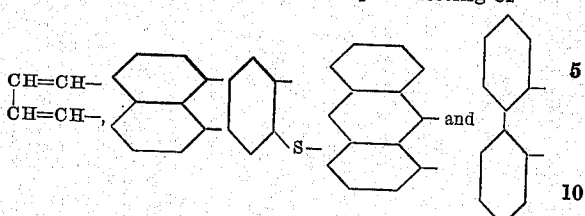

9. The pigments which are obtained by heating at about 120° C. to about 125° C. for five hours in the presence of anhydrous pyridine and cuprous bromide a compound of the group consisting of pyrazine-2.3-dinitriles of the general formulae

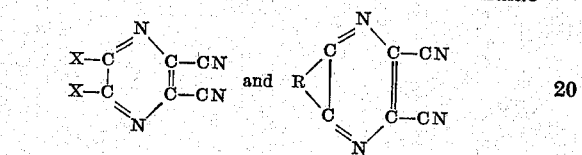

wherein X represents a member of the group consisting of hydrogen, methyl and phenyl and R represents a member of the group consisting of

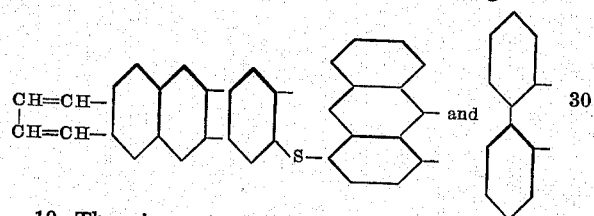

10. The pigment which is obtained by heating at about 120° C. to about 125° C. for five hours in the presence of anhydrous pyridine and cuprous bromide the compound of the formula

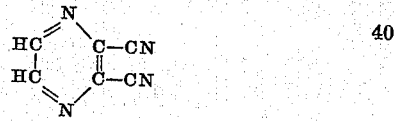

forming a reddish blue powder which is a pigment dyestuff with very good properties of fastness.

11. The pigment which is obtained by heating at about 120° C. to about 125° C. for five hours in the presence of anhydrous pyridine and cuprous bromide the compound of the formula

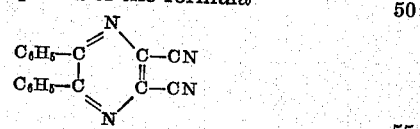

forming, when redissolved from concentrated sulfuric acid a powder of emerald color which is a pigment dyestuff with very good properties of fastness.

12. The pigment which is obtained by heating at about 120° C. to about 125° C. for five hours in the presence of anhydrous pyridine and cuprous bromide the compound of the formula

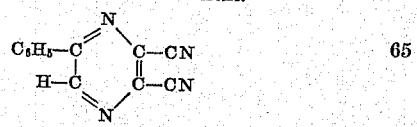

forming a blue green powder which is soluble to a small amount in pyridine to a blue green solution and in concentrated sulfuric acid to a greenish grey solution and which is a pigment dyestuff with very good fastness properties.

WILHELM ECKERT.
FERDINAND QUINT.